L. H. WHEELER.
FUEL SUPPLY DEVICE FOR INTERNAL COMBUSTION ENGINES.
APPLICATION FILED OCT. 16, 1919.
1,432,935.  
Patented Oct. 24, 1922.  
2 SHEETS—SHEET 1.
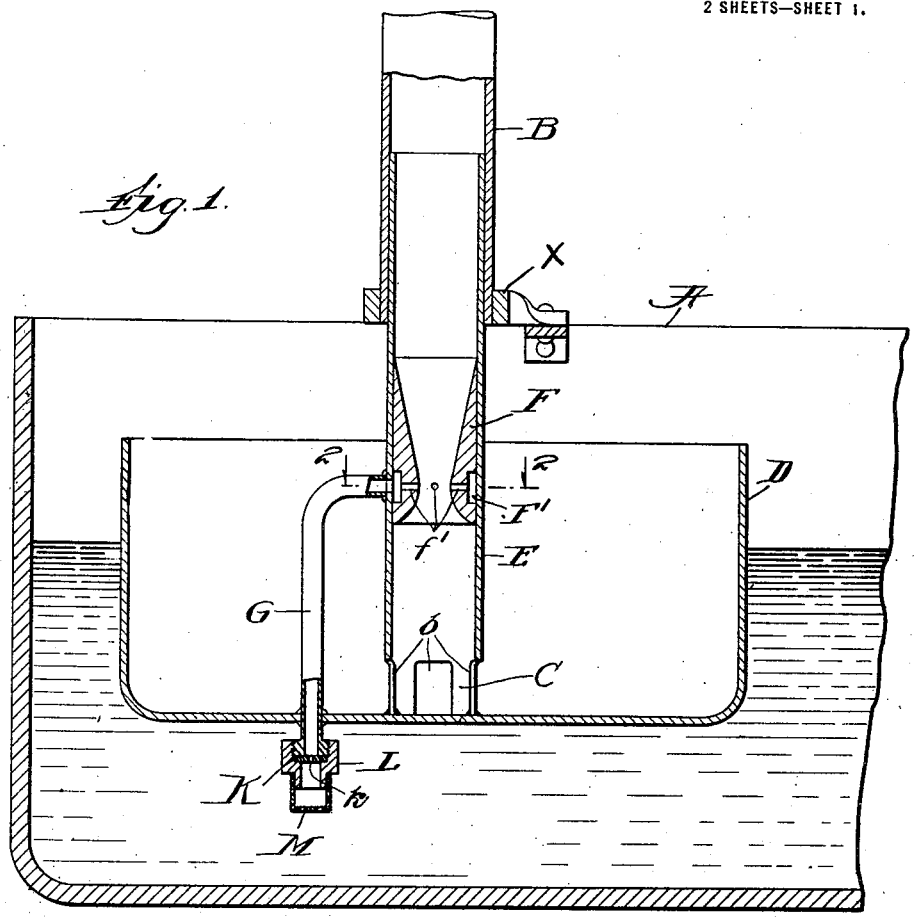
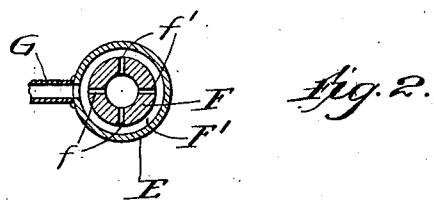
Inventor;  
Leonard H. Wheeler,  
by Burton & Burton  
Attys.
Witness;

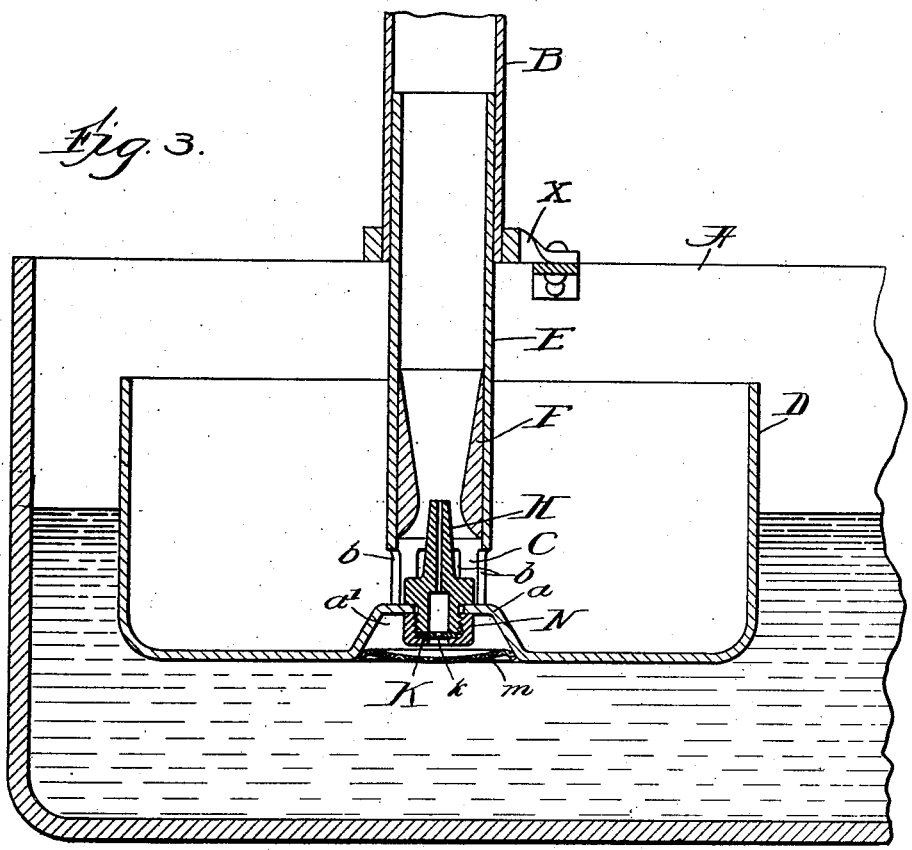

Patented Oct. 24, 1922.

1,432,935

UNITED STATES PATENT OFFICE.

LEONARD H. WHEELER, OF CHICAGO, ILLINOIS, ASSIGNOR TO STEWART-WARNER SPEEDOMETER CORPORATION, OF CHICAGO, ILLINOIS, A CORPORATION OF VIRGINIA.

FUEL-SUPPLY DEVICE FOR INTERNAL-COMBUSTION ENGINES.

Application filed October 16, 1919. Serial No. 331,103.

*To all whom it may concern:*

Be it known that I, LEONARD H. WHEELER, a citizen of the United States, residing at Chicago, in the county of Cook and State of Illinois, have invented certain new and useful Improvements in Fuel-Supply Devices for Internal-Combustion Engines, of which the following is a specification, reference being had to accompanying drawings, forming a part thereof.

The purpose of this invention is to provide an improved device for supplying fuel to an internal combustion engine. It consists in the elements and features of construction shown and described, as indicated in the claims.

In the drawings:

Figure 1 is a vertical section, axial with respect to the fuel supply conduit of a device embodying this invention, the same being shown without the engine which is served, the fuel conduit being broken off.

Figure 2 is a section at the line 2—2, on Figure 1.

Figure 3 is a view similar to Figure 1, showing a modification.

In the drawings A represents a liquid fuel reservoir from which an internal combustion engine may be supplied with fuel. B represents a conduit for the fuel supply to the engine, and it may be understood that said conduit extends to the engine to be supplied and is connected therewith in the usual manner in which a fuel supply conduit is connected for serving the engine. The portion of this conduit shown is vertical, but it may be understood that properly beyond the portion shown, it may be extended in any direction to reach the engine. The pipe, B, is in any convenient manner made fixed with respect to the reservoir, A, as, by the supporting strap or bracket $x$, and has air intake through the mouths, $b, b$, at the lower end, C. The tank A, is shown as upwardly open, but it is not necessarily to be understood that it is uncovered, but merely that it has access to atmospheric pressure. Within the tank, A, there is a float, D, which, as shown, is an upwardly-open vessel, but may be in any form for floating and having atmospheric access to its cavity. Secured in any convenient manner to this float vessel and extending down therein is a pipe member, E, which telescopes within the conduit pipe, B, being extended up vertically into said pipe member, B, for a distance at least greater than the anticipated maximum change of the liquid level in the reservoir, A. In the pipe, E, there is a sleeve, F, comprising a Venturi passage which may be permanently fixed in said pipe. This Venturi member has a circumferential recess or groove, $F^1$, proximate to the zone of maximum constriction of the Venturi throat, and a plurality of ducts $f^1$, leading from said recess or groove into the Venturi passage, and opening therein quite closely proximate to the transverse plane of maximum constriction. G is a liquid fuel supply pipe which is connected to the pipe member, E, so as to discharge thereinto at the groove or recess, $F^1$, and thereby afford liquid communication with the ducts, $f^1$, for delivery of liquid fuel in the Venturi passage. Said pipe, G, extends down within the float vessel, D, and out through the bottom thereof, being made liquid-tight at its emergence therethrough into the liquid-occupied space of the reservoir, A. The liquid inlet into this liquid supply pipe, G, is restricted and controlled or metered by means of a thin metal disk, K, suitably retained over the end of the pipe by the coupling fitting, L, said disk having a relatively minute aperture, $k$, for the entrance of liquid from the reservoir. M is a strainer secured to the fitting, L, to prevent the entrance of impurities which may be in the liquid.

The operation of the device may be understood to be that upon suction being produced in the pipe, B, by the strokes of the engine, the resultant inrush of air through the lower intake mouth or mouths, $b, b$, of the pipe, E, and the resulting relatively high velocity of the air through the Venturi constriction, operates in a well understood manner to cause the liquid fuel to be sucked up from the reservoir through the pipe, G, and discharged through the apertures, $f^1$ into the Venturi passage and dispersed in very fine particles into the current of air rushing therethrough, so as to be carried therewith to the engine. The purpose of this particular construction comprising the float, which carries the liquid and air intake connections to the Venturi passage, is to insure substantially uniform lift or necessity for lift of the liquid through the pipe, G, to the discharge thereof into the Venturi passage, for it will be understood that the liquid will at all times stand in the pipe, G, up to the level of the liquid outside the float vessel, and that the suction or entrainment effort necessary for drawing the liquid into and discharging it in the Venturi throat will at all times be measured by the distance from the liquid level to the level of the apertures, $f^1$; and this distance will be the same, regardless of the depth of liquid in the reservoir, because of the float following the liquid level up and down as it changes.

In the modification shown in Figure 3, the liquid fuel reaches the point of its discharge in the Venturi at the level of the maximum constriction thereof by way of a nozzle, H, situated axially with respect to the venturi and terminating for its liquid discharge at substantially the same level as the duct $F^1$, of the previously described form. For receiving the liquid fuel from the tank, the nozzle, H, is mounted at the bottom of the pipe member, E, and the bottom of the tank is struck up at $a$, to form a pocket, $a^1$, at the under side. The pipe, E, is mounted on the top of this up-raise, $a$, and the nozzle is mounted liquid-tight in said up-raise, having its intake below the same within the pocket, $a^1$; and a strainer, $m$, is applied on the bottom of the pocket. Obvious means for securing the nozzle to the up-raise, $a$, consists of a flanged terminal, N, which retains a metering disk, K, having the same function as in the previously described form.

I claim:—

1. In a device for supplying liquid fuel to an internal combustion engine, in combination with a liquid reservoir, a vessel adapted to float in the liquid therein and open to the air above the liquid level thereof; a fuel mixture pipe leading from the cavity of said vessel mounted on the vessel for movement therewith, and having an air intake within the vessel, and a liquid fuel discharge connection also mounted on and for movement with the vessel, leading from the liquid in which the vessel floats into said fuel mixture pipe at a point above the air-intake of the latter.

2. In the construction defined in claim 1 foregoing, the mixture supply pipe having a Venturi throat member therein and secured thereto, for movement therewith in the movement of said pipe with the vessel; whereby the relative position of the liquid fuel discharge connection to the venturi is unchanged in the rising and falling of the vessel upon change of level of the liquid in the reservoir.

3. In the construction defined in claim 1, the fuel mixture pipe being located within the vessel and extending out, liquid-tight, through the bottom thereof for its liquid intake.

In testimony whereof, I have hereunto set my hand at Chicago, Illinois, this 11th day of October, 1919.

LEONARD H. WHEELER.